June 26, 1951     W. C. WALSH     2,558,023
EXHAUST ATTACHMENT
Filed June 22, 1948

William C. Walsh
INVENTOR.

Patented June 26, 1951

2,558,023

UNITED STATES PATENT OFFICE 2,558,023

EXHAUST ATTACHMENT

William C. Walsh, Chicago, Ill.

Application June 22, 1948, Serial No. 34,511

1 Claim. (Cl. 138—46.5)

This invention relates to new and useful improvements in exhaust attachments and the primary object of the present invention is to provide an attachment for the exhaust pipe of an automobile engine to prevent the hot gases normally discharged from the exhaust pipe from rising to damage or injure some portion of the automobile, and which will direct and deflect hot gases and exhaust heat emitted from an exhaust pipe in a downward direction to contact road surfaces and the like with a tendency to melt ice, snow and the like on the said surfaces thereby preventing skidding or slipping of the vehicle tires during backing up of the vehicle.

Another important object of the present invention is to provide an exhaust attachment including a flexible body or conduit that is removably secured to the exhaust pipe of a vehicle and which includes a downwardly extending, substantially vertical, end portion that will direct gases passing from the exhaust pipe downwardly to guard or shield the vehicle from the same.

A further object of the present invention is to provide an exhaust attachment for vehicles including a flexible conduit having a flared delivery or discharge end that will spread the hot gases normally leaving the exhaust pipe and which is so positioned as to prevent undesirable damage to the tires of a vehicle.

A still further aim of the present invention is to provide an exhaust deflector that is small and compact in structure, simple and practical in construction, neat and attractive in appearance, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
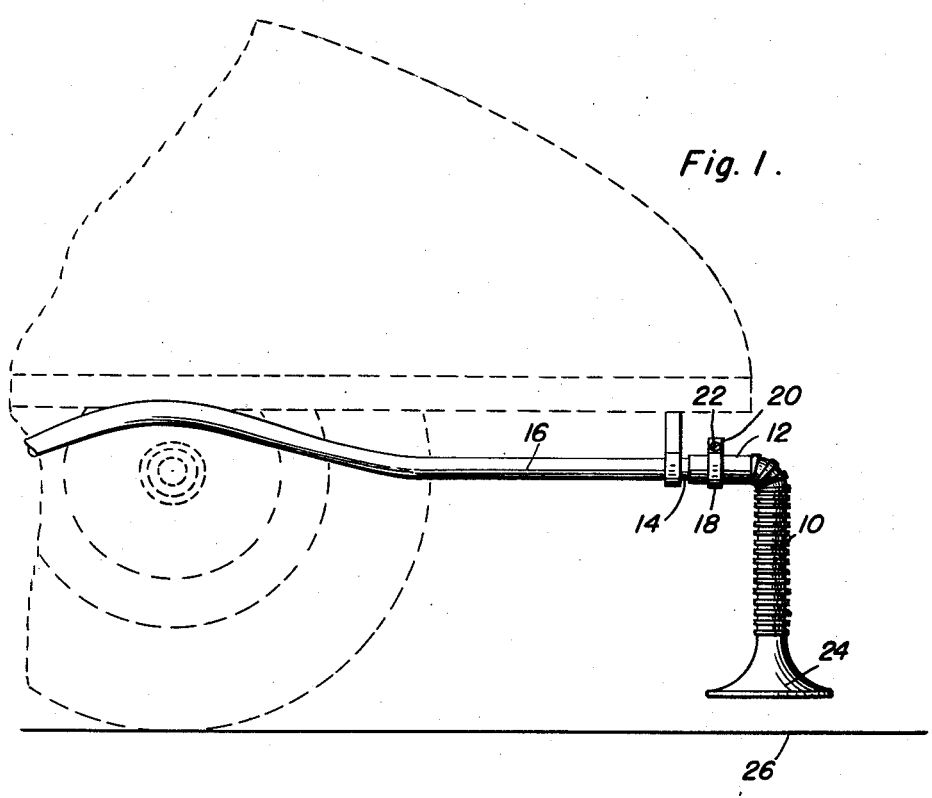
Figure 1 is an elevation, showing certain portions of an automobile in dotted line, illustrating the present invention applied to the exhaust pipe of the automobile.
Figure 2:
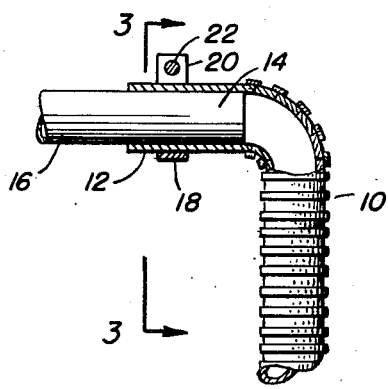
Figure 2 is an enlarged fragmentary side elevational view of Figure 1, and with parts thereof broken away and shown in section for the convenience of explanation; and, Figure 3 is a transverse vertical sectional view taken substantially on the plane of section line 3—3 of Figure 2.
Figure 3:
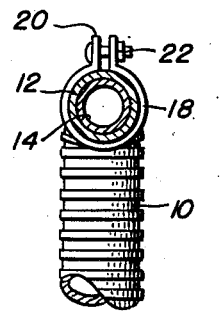

Referring now to the drawings in detail, and for the purpose of illustration, there is disclosed a preferred embodiment of the present invention, the numeral 10 represents a flexible conduit or body of any suitable material having a sleeve 12 formed at one end that will engage the delivery end 14 of a vehicle exhaust pipe 16.

In order to removably retain the sleeve 12 positioned on the delivery or discharge end 14 of the exhaust pipe 16, there is provided a split sleeve band 18 having a pair of spaced parallel gears 20 that are adjustably connected by a fastener 22.

The main portion of the flexible body 10 depends downwardly in a substantially vertical position from the exhaust 16, and terminates in an outwardly flared or conical projection 24 that is spaced above and preferably parallel to the ground surface 26 or that surface over which the vehicle is passing.

In practical use of the present invention, it being understood that the body or conduit 10 is applied to the exhaust 16 as shown in Figure 1 of the drawings, the hot gases emitted from the exhaust 16 that normally rise and engage or contact a portion of the vehicle or more particularly the tires of the vehicle, will be directed downwardly due to the positioning of the conduit 10. Since this conduit 10 is provided with a substantially conical or flared end portion 24, the gases will engage the ground surface 26 to be spread outwardly in various directions, thus restricting and reducing the amount of gases that will engage the vehicle.

It should be noted, that the flexibility of the body 10 will permit the same to engage obstacles or other elements which may be extending from the road surface, the said body will not break or bend but will assume its normal vertical position after the vehicle has passed over the obstruction. Due to the weighted projection 24 of the body 10, the same will normally hang or depend in a vertical position which will permit gases to be discharged from the same in a more effective and efficient manner than was heretofore possible.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

For use with the exhaust pipe of a vehicle, an exhaust deflector comprising a flexible conduit having upper and lower portions, means for detachably securing the upper portion of said conduit to an exhaust pipe at the discharge end thereof, the lower portion of said conduit depending from the upper portion thereof, and a funnel-shaped member secured to the lower portion of said conduit for dispersing exhaust gases discharged therefrom and for also retaining the lower portion of said conduit substantially vertical.

WILLIAM C. WALSH.

REFERENCES CITED

The following references are of record in the file of this patent:

UNITED STATES PATENTS

| Number | Name | Date |
|---|---|---|
| 704,233 | Brown | July 8, 1902 |
| 950,225 | Donnelly | Feb. 22, 1910 |
| 1,811,816 | Blake | June 23, 1931 |
| 2,376,550 | May | May 22, 1945 |